United States Patent [19]

Diery et al.

[11] 3,928,509
[45] Dec. 23, 1975

[54] HYBRID IONIC PHOSPHORUS COMPOUNDS

[75] Inventors: Helmut Diery, Kelkheim, Taunus; Ulrich Cuntze, Hofheim, Taunus, both of Germany

[73] Assignee: Hoechst Aktiengesellschaft, Frankfurt am Main, Germany

[22] Filed: Apr. 10, 1974

[21] Appl. No.: 459,545

[30] Foreign Application Priority Data
Apr. 14, 1973 Germany............................ 2319047

[52] U.S. Cl. ............... 260/945; 260/924; 260/932; 260/937; 424/211
[51] Int. Cl.² ..................... C07F 9/141; A01N 9/36
[58] Field of Search..................... 260/924, 945, 928

[56] References Cited
UNITED STATES PATENTS
3,507,937   4/1970   Zimmerer........................... 260/924

*Primary Examiner*—Anton H. Sutto
*Attorney, Agent, or Firm*—Connolly and Hutz

[57] ABSTRACT

Hybrid ionic phosphorus compounds being useful as disinfecting cleansing agent and having the general formula I

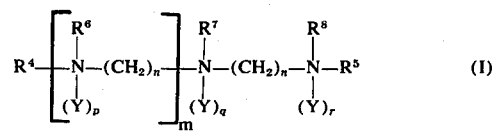

in which $R^4$ stands for a long chain alkyl or alkenyl group, $R^5$ for hydrogen, an alkyl or alkenyl group, $R^6$, $R^7$ and $R^8$ each stands for hydrogen, methyl or ethyl, $m$, $p$, $q$ and $r$ each stands for zero or 1, the sum of all values of $p$, $q$ and $r$ having to be at least 1, $n$ is 2 or 3, and Y stands for a group of the formula II

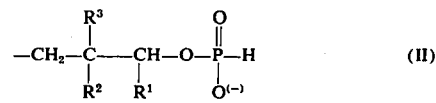

in which $R^1$ stands for hydrogen or methyl group, $R^2$ and $R^3$ each for hydrogen or a lower alkyl group.

3 Claims, No Drawings

HYBRID IONIC PHOSPHORUS COMPOUNDS

The present invention relates to hybrid ionic phosphorus compounds whose positive charge center is separated from the negative charge center by at least three carbon atoms.

This invention provides novel hybrid ionic phosphites of the general formula I

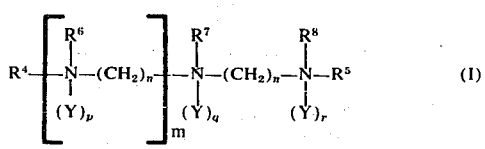

in which $R^4$ stands for an alkyl or alkenyl group having 8 to 20 carbon atoms, $R^5$ stands for a hydrogen atom, an alkyl or alkenyl group having 1 to 20 carbon atoms, $R^6$, $R^7$ and $R^8$ each stands for a hydrogen atom, a methyl or ethyl group, $m$ stands for zero or 1, $n$ for 2 or 3 and $p$, $q$ and $r$ each stands for zero or 1, the sum of all figures for $p$, $q$ and $r$ having to be at least 1, Y stands for a group of the formula II

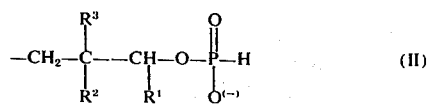

in which $R^1$ stands for a hydrogen atom or the methyl group, $R^2$ and $R^3$ each stands for a hydrogen atom or an alkyl group of 1 to 4 carbon atoms, which may be identical or different.

This invention moreover relates to a process for the preparation of the hybrid ionic phosphorus compounds as defined by formula I, which comprises reacting a cyclic phosphite of the formula III

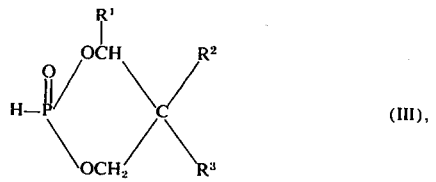

in which $R^1$, $R^2$ and $R^3$ are defined as above, with an amine of the formula

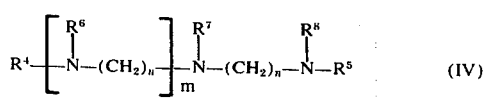

in which $R^4$, $R^5$, $R^6$, $R^7$, $R^8$, $n$ and $m$ are defined as above, at an elevated temperature, advantageously while stirring.

The compounds to be used as starting materials are known or may be prepared according to methods known per se.

As amines of the general formula IV used for the process of the invention, there may be mentioned, for example, N-n-dodecyl diethylene triamine, N-n-octyl-diethylene triamine, N-coconut fat alkyl-propylene diamine, N-stearyl propylene diamine, N-tallow fat alkyl-propylene diamine, N-tallow fat alkyl-dipropylene triamine, N,N'-di-n-dodecyl diethylene triamine, 1,12-diamino-dodecane, the diamines being preferably used for economical reasons.

A monofunctional hybrid ionic phosphorus compound of formula I (wherein the sum of $(m\,p)+q+r=1$) is prepared by reacting about 1 mol of amine with 1 mol phosphite. A bifunctional hybrid ionic phosphorus compound is prepared by reacting about 1 mol of amine with 2 mols of phosphite and a trifunctional hybrid ionic phosphorus compound is prepared by reacting about 1 mol of amine with 3 mols of phosphite. Generally speaking, about 1 mol of amine may be reacted with up to 3 mols of phosphite according to formula I: $(m\,p)+q+r$ mol of phosphite. The reaction is preferably carried out at a temperature of about 60° to 150°C. Depending on the boiling and melting temperatures of the amine used, the reaction may be performed in the melt or using an adequate polar solvent, for example water or alcohols. The reaction products are directly obtained with a good purity so that they need generally not be purified in particular. When water or a solvent is used for the reaction, this has merely to be distilled off.

Generally, the reaction according to the invention is preferably carried out in a solvent, especially in water. Depending on the temperature applied, the reaction is generally complete within about 1 to 3 hours. In this case, the disappearance of previously insoluble starting products usually indicates the end of the reaction, since the reaction products are now soluble in water and other polar solvents.

The novel hybrid ionic phosphorus compounds are intermediates to be used for many purposes, for example for the production of pesticides or textile adjuvants.

The compounds moreover have surface-active properties and may find versatile utility as surface-active agents. For example, they are excellent emulsifiers for the preparation of oil-in-water emulsions, especially for preparing emulsifiable concentrates of water-insoluble biocidal substances. Further, the compounds exhibit a very high bactericidal activity against pathogens, especially against worm eggs and in particular against eel-worm eggs; they may therefore be used with particular advantage as disinfecting cleansing agents.

The novel compounds of the invention also have anti-electrostatic properties; they may therefore also be used as antistatic additives in plastics or synthetic fiber materials, such as polyamides or polyesters, or for the production of preparation agents for textile fibers.

The following Examples illustrate the invention, the parts and percentages being by weight unless stated otherwise.

EXAMPLE 1

21.5 Grams of N-octyl-diethylene triamine and 20.6 g of 2-oxo-(2H)-5-methyl-5-n-butyl-1,3-dioxa-2-phosphorinane were refluxed at the boil while stirring for 2 hours with 50 cc. of water. The solution was then evaporated to dryness. 39 g of a compound of the formula

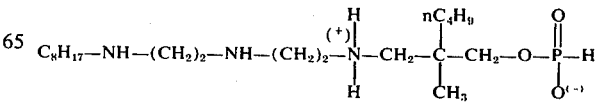

| Equivalent weight | calc. 421 |
| --- | --- |
|  | found 413 |
| Basic nitrogen | calc. 10.0 % |
|  | found 9.7 % |

| Equivalent weight | calc. 421 |
| --- | --- |
|  | found 440 |
| Basic nitrogen | calc. 10.0 % |
|  | found 9.7 % |

EXAMPLE 2

32.8 Grams of N-coconut fat alkyl dipropylene triamine and 13.6 g of 2-oxo-(2H)-6-methyl-1,3-dioxa-2-phosphorinane were refluxed at the boil for 2 hours with 50 cc. of water. The solution was then evaporated to dryness. 43 g of a compound of the formula

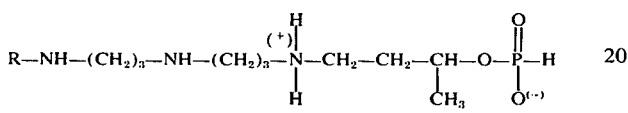

in which R is an alkyl group with the chain distribution corresponding to the coconut fatty acid, were obtained in the form of a viscous, water-soluble, colorless oil.

| Equivalent weight | calc. 464 |
| --- | --- |
|  | found 448 |
| Basic nitrogen | calc. 9.0 % |
|  | found 8.9 % |

EXAMPLE 3

27.4 Grams of N-coconut fat alkyl propylene diamine and 12.2 g of 2-oxo-(2H)-1,3-dioxa-2-phosphorinane were refluxed at the boil while stirring for 90 minutes in 80 cc. of water. The solution was then evaporated to dryness. 36 g of a compound of the formula

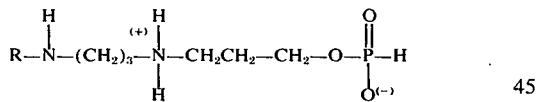

in which R is an alkyl group with the chain distribution corresponding to the coconut fatty acid, were obtained in the form of a water-soluble, colorless oil.

| Equivalent weight | calc. 396 |
| --- | --- |
|  | found 400 |
| Basic nitrogen | calc. 7.1 % |
|  | found 6.9 % |

EXAMPLE 4

54.2 Grams of N-n-dodecyl-diethylene triamine and 30 g of 2-oxo-(2H)-5,5-dimethyl-1,3-dioxa-2-phosphorinane were refluxed at the boil for 2 hours with 150 cc. of water. The solution was then evaporated to dryness. 81 g of a compound of the formula

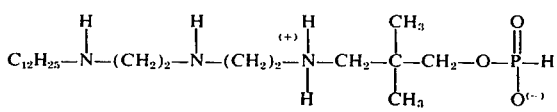

EXAMPLE 5

27.4 Grams of N-coconut fat alkyl propylene diamine and 15 g of 2-oxo-(2H)-5,5-dimethyl-1,3-phosphorinane were refluxed at the boil for 2 hours in 80 cc. of water. The solution was then evaporated to dryness. 40 g of a compound of the formula

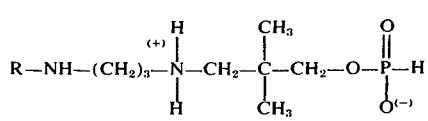

in which R is an alkyl group with the chain distribution corresponding to the coconut fatty acid, were obtained in the form of a colorless, water-soluble oil.

| Equivalent weight | calc. 424 |
| --- | --- |
|  | found 436 |
| Basic nitrogen | calc. 6.6 % |
|  | found 6.4 % |

EXAMPLE 6

35.5 Grams of tallow fat alkyl propylene diamine and 30 g of 2-oxo-(2H)-5,5-dimethyl-1,3-dioxa-2-phosphorinane were refluxed at the boil for 2 hours in 100 cc. of water. The solution was then evaporated to dryness. 63 g of a compound of the formula

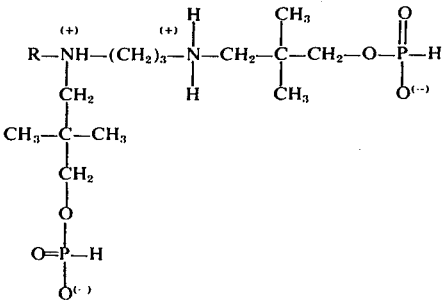

in which R is an alkyl group with the chain distribution corresponding to the tallow fatty acid, were obtained in the form of a faintly yellow, water-soluble oil.

| Equivalent weight | calc. 327 |
| --- | --- |
|  | found 331 |
| Basic nitrogen | calc. 4.3 % |
|  | found 4.0 % |

EXAMPLE 7

27.4 Grams of coconut fat alkyl propylene diamine and 20.6 g of 2-oxo-(2H)-5-ethyl-5-n-butyl-1,3-dioxa-2-phosphorinane were refluxed at the boil for 2 hours in 150 cc. of water. The solution was then evaporated to dryness. 45 g of a compound of the formula

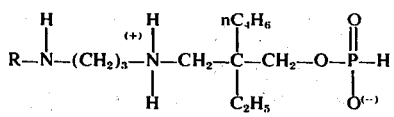

in which R is an alkyl group with the chain distribution corresponding to the coconut fatty acid, were obtained in the form of a colorless, water-soluble oil.

| Equivalent weight | calc. 480 |
|---|---|
|  | found 495 |
| Basic nitrogen | calc. 4.8 % |
|  | found 4.6 % |

EXAMPLE 8

43.8 Grams of N,N'-di-n-dodecyl-diethylene triamine and 15 g of 2-oxo-(2H)-5,5-dimethyl-1,3-dioxa-2-phosphorinane were refluxed at the boil for 2 hours with 200 cc. of water. The solution was then evaporated to dryness. 56 g of a compound of the formula

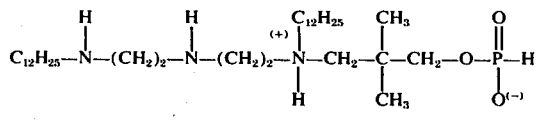

were obtained in the form of a colorless oil.

| Equivalent weight | calc. 588 |
|---|---|
|  | found 600 |
| Basic nitrogen | calc. 7.1 % |
|  | found 6.9 % |

The antibacterial activity of the compounds of the formula I was examined in a series dilution test in analogy to the prescriptions of "Deutsche Gesellschaft fur Hygiene und Mikrobiologie". As comparative substance, a commercial amphoteric compound of the formula

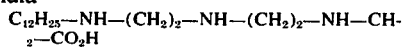

was used. The substances to be tested were diluted in a geometrically descending series (factor 2) with Merck-I bouillon and inoculated with 2 drops each of a bacteria culture 24 hours old and diluted in a ratio of 1 : 100. The results were ascertained after an incubation period of 18 hours at 37°C. The minimum inhibition concentration is the minimum concentration (unit by weight per milliliter of test solution) found in the series dilution test, of an antibacterially active substance, at which a growth of the tested organisms could no longer be observed. The tests were carried out with the compounds of Example 3, 4 and 5. The results of the tests are summarized in Tables I and II.

TABLE I

| Type of pathogen | Minimum inhibition concentration (unit by weight/ml) | | | | | |
|---|---|---|---|---|---|---|
|  | Compound 4 | | Compound 3 | | Comparative product | |
| Salm. paratyphi A | 6.25 | γ | 12.5 | γ | 3.1 | γ |
| typhi murium | 12.5 | γ | 12.5 | γ | 12.5 | γ |
| oranienburg | 25 | γ | 6.25 | γ | 25 | γ |
| typhi | 12.5 | γ | 6.25 | γ | 12.5 | γ |
| orion | 12.5 | γ | 6.25 | γ | 6.25 | γ |
| give | 12.5 | γ | 6.25 | γ | 25 | γ |
| Shigella flexneri | 6.25 | γ | 6.25 | γ | 12.5 | γ |
| E. coli 026 | 6.25 | γ | 6.25 | γ | 12.5 | γ |
| 055 | 6.25 | γ | 6.25 | γ | 25 | γ |
| 078 | 6.25 | γ | 12.5 | γ | 25 | γ |
| 086 | 12.5 | γ | 12.5 | γ | 25 | γ |
| 0114 | 6.25 | γ | 12.5 | γ | 25 | γ |
| 0126 | 6.25 | γ | 12.5 | γ | 25 | γ |
| Aerobacter cloacae | 6.25 | γ | 6.25 | γ | 25 | γ |
| aerogenes | 12.5 | γ | 25 | γ | 50 | γ |
| Paracolob. Hafnia | 12.5 | γ | 12.5 | γ | 25 | γ |
| Bethesda-Ballerup | 12.5 | γ | 6.25 | γ | 12.5 | γ |
| Providencia | 3.1 | γ | 12.5 | γ | 50 | γ |
| Klebs. pneumoniae | 3.1 | γ | 6.25 | γ | 12.5 | γ |
| Prot. mirabilis | 500 | γ | 250 | γ | 1 | mg |
| 60/3 | 250 | γ | 250 | γ | 1 | mg |
| 112/3 | 250 | γ | 250 | γ | 1 | mg |
| 166/3 | 250 | γ | 250 | γ | 1 | mg |
| 174/3 | 250 | γ | 125 | γ | 1 | mg |
| Pseud. aeruginosa | 12.5 | γ | 6.25 | γ | 50 | γ |
| 77/2 | 25 | γ | 12.5 | γ | 50 | γ |
| 110/2 | 12.5 | γ | 12.5 | γ | 50 | γ |
| 880/2 | 12.5 | γ | 12.5 | γ | 50 | γ |
| 2467/2 | 25 | γ | 12.5 | γ | 50 | γ |
| 2520/2 | 25 | γ | 25 | γ | 50 | γ |

TABLE II

| Type of pathogen | Minimum inhibition concentration (unit by weight/ml) | | | |
|---|---|---|---|---|
|  | Compound 5 | | Comparative product | |
| Salm. paratyphi A | 3.9 | γ | 15.6 | γ |
| typhi murium | 15.6 | γ | 31.5 | γ |
| oranienburg | 15.6 | γ | 31.5 | γ |
| typhi | 7.8 | γ | 31.5 | γ |
| give | 7.8 | γ | 15.6 | γ |
| Shigella flexneri | 7.8 | γ | 15.6 | γ |
| E. coli 026 | 15.6 | γ | 31.5 | γ |
| 055 | 3.9 | γ | 15.6 | γ |
| 078 | 3.9 | γ | 7.8 | γ |
| 086 | 1.25 | γ | 15.6 | γ |
| 0114 | 3.9 | γ | 15.6 | γ |
| 0126 | 7.8 | γ | 15.6 | γ |
| Aerobacter cloacae | 3.9 | γ | 15.6 | γ |
| aerogenes | 15.6 | γ | 31.5 | γ |
| Paracolob. Hafnia | 15.6 | γ | 31.5 | γ |
| Bethesda-Ballerup | 7.8 | γ | 31.5 | γ |
| Providencia | 31.5 | γ | 125 | γ |
| Klebs. pneumoniae | 6.25 | γ | 7.8 | γ |
| Prot. mirabilis | 625 | γ | 1.25 | mg |
| 60/3 | 625 | γ | 2.5 | mg |
| 112/3 | 1.25 | mg | 1.25 | mg |
| 166/3 | 625 | γ | 1.25 | mg |
| 174/3 | 156 | γ | 1.25 | mg |
| Pseud. aeruginosa | 15.6 | γ | 31.5 | γ |
| 77/2 | 15.6 | γ | 62.5 | γ |
| 110/2 | 15.6 | γ | 62.5 | γ |
| 880/2 | 15.6 | γ | 62.5 | γ |
| 2467/2 | 15.6 | γ | 62.5 | γ |
| 2520/2 | 15.6 | γ | 62.5 | γ |

As the tests of Table I and Table II were carried out under different conditions, it is not possible directly to compare the results of Table I with those of Table II. The results demonstrate that the amount of the compounds of formula (I) sufficient to achieve a growth inhibition is smaller than that of the comparative product.

The killing effect on worm eggs of the compounds of the formula (I) was determined according to the following method:

Eggs of a female eelworm were collected and subjected to the action of the test substance for the periods of time and at the concentrations as indicated in the following Table III. The preparations were then washed five times with water with decantation, and the eggs were incubated for 4 weeks at 37°C. After termination of embryogenesis, the number of mobile (= developed) embryos was ascertained in comparison to the untreated eelworm eggs and the infectivity of the eggs treated with the test substances was examined on mice. To this effect, each time 10,000 treated eggs were orally administered to mice. Five days after administration the mice were killed and the lungs and livers of the dissected mice were examined as for the presence of ascarides larvae.

A 100 % disinfection effect was obtained when the embryogenesis was reduced by 100 %, when there was no mobility of the embryos and no ascarides larvae could be found in the mice.

In the following Table III, the disinfecting activity of the compounds 1 and 3 to 11 of formula (I) specified in the foregoing Examples is shown in comparison to the relevant commercial product Dekaseptol[R].

TABLE III

| Compound | Time (min.) | Concentration applied | Killing rate |
|---|---|---|---|
| 3 | 5 | 1.5 % | 100 % |
| 4 | 5 | 1.5 % | 100 % |
| 5 | 5 | 1.5 % | 100 % |
| Dekaseptol[R] | 5 | 10 % | <20 % |
|  | 30 | 6 % | 70 % |

The compounds of formula (I) may be used either as such or in the form of a solution in a solvent miscible with water, preferably in the form of a solution in water, to disinfect rooms and objects, especially stables and sties, and yards and runs for animals. A disinfectant according to the present invention may contain from 20 to 90 % by weight, preferably from 40 to 70 % by weight, of a compound of formula I as active ingredient dissolved in water.

For application, the disinfectant is generally diluted in water to have a content of active ingredient in the range of from 0.5 to 10 % by weight.

We claim:

1. A compound of the general formula I

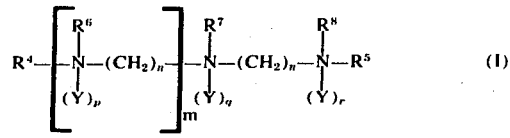

in which $R^4$ stands for an alkyl or alkenyl group of 8 to 20 carbon atoms, $R^5$ for hydrogen, an alkyl or alkenyl group of 1 to 20 carbon atoms, $R^6$, $R^7$ and $R^8$ each stands for hydrogen, the methyl or ethyl group, $m$ for zero or 1, $n$ for 2 or 3 and $p$, $q$ and $r$ each stands for zero or 1, the sum of all values of $p$, $q$ and $r$ having to be 1 or 2; Y stands for a group of the formula II

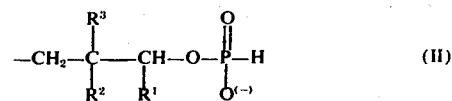

in which $R^1$ stands for hydrogen, $R^2$ and $R^3$ each for hydrogen or an alkyl group of 1 to 4 carbon atoms, which may be identical or different.

2. A compound of the general formula

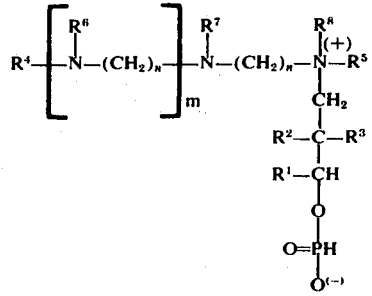

in which $R^1$ to $R^8$, $m$ and $n$ are defined as in claim 1.

3. A compound of the formula

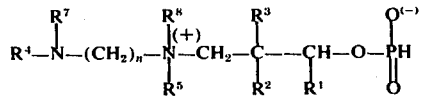

in which $R^1$ to $R^5$, $R^7$, $R^8$ and $n$ are defined as in claim 1.

* * * * *